United States Patent
Ayoub et al.

(10) Patent No.: US 11,090,911 B2
(45) Date of Patent: Aug. 17, 2021

(54) METHOD FOR PRODUCING HUD COMPATIBLE WINDSHIELDS AND UNIVERSAL WEDGE LAYER FOR A WINDSHIELD

(71) Applicant: AGC GLASS EUROPE, Louvain-la-Neuve (BE)

(72) Inventors: Patrick Ayoub, Louvain-la-Neuve (BE); Jonathan Vivier, Beuzet (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 147 days.

(21) Appl. No.: 16/305,595

(22) PCT Filed: May 12, 2017

(86) PCT No.: PCT/EP2017/061450
§ 371 (c)(1),
(2) Date: Nov. 29, 2018

(87) PCT Pub. No.: WO2017/207248
PCT Pub. Date: Dec. 7, 2017

(65) Prior Publication Data
US 2020/0276793 A1     Sep. 3, 2020

(30) Foreign Application Priority Data
May 30, 2016   (EP) .................................. 16171988

(51) Int. Cl.
*B32B 17/10*      (2006.01)
*B60R 11/00*     (2006.01)
(Continued)

(52) U.S. Cl.
CPC .. *B32B 17/10568* (2013.01); *B32B 17/10036* (2013.01); *B60R 11/0235* (2013.01);
(Continued)

(58) Field of Classification Search
CPC .. G02B 27/0101; G02B 27/28; G02B 5/0816; G02B 2027/0121; G02B 27/0018;
(Continued)

(56) References Cited

U.S. PATENT DOCUMENTS 5,013,134 A *  5/1991  Smith ............... B32B 17/10568
                                                                    345/7
5,812,332 A    9/1998  Freeman
(Continued)

FOREIGN PATENT DOCUMENTS

DE        102013012648 A1    3/2014
WO      WO 2015/086234 A1    6/2015

OTHER PUBLICATIONS

International Search Report dated Jul. 7, 2017, in PCT/EP2017/061450, filed May 12, 2017.

*Primary Examiner* — Brandi N Thomas
(74) *Attorney, Agent, or Firm* — Oblon, McClelland, Maier & Neustadt, L.L.P.

(57) ABSTRACT

Method for producing a HUD compatible windshield comprising a HUD viewing field (13), said windshield comprising a wedge layer (15) made from a universal wedge layer (14), said universal wedge layer (14) comprising a portion (12) with a thickness profile having a monotonously changing wedge angle wherein said profile comprises a range of wedge angles encompassing wedge angle values adapted to different windshield models, said universal wedge layer (14) having dimensions different from the dimensions of said windshield, said method comprising the following step of: Adapting the dimensions of the universal wedge layer (14) to size said wedge layer (15), wherein said adapting is such that said wedge layer (15) the dimensions of said windshield and such that the wedge angle (W1, W2) at the centre (X1, X2) of the HUD viewing field is appropriate for compensating the double images occurring in reflection at outside
(Continued)

and inside surfaces (8, 9) of the windshield at the centre (X1, X2) of said HUD viewing field (13).

13 Claims, 4 Drawing Sheets

(51) Int. Cl.
*B60R 11/02* (2006.01)
*G02B 27/01* (2006.01)

(52) U.S. Cl.
CPC .. *G02B 27/0101* (2013.01); *B60R 2011/0026* (2013.01); *B60R 2300/205* (2013.01)

(58) Field of Classification Search
CPC .. G02B 5/3058; G02B 5/3083; G02B 5/3025; G02B 2027/012; G02B 2027/0194; G02B 27/281; G02B 5/3066; B60J 1/20; B60J 3/007; B60J 1/02
USPC .......................... 359/630–636, 242, 265–267
See application file for complete search history.

(56) References Cited

U.S. PATENT DOCUMENTS

| | | |
|---|---|---|
| 2002/0008926 A1 | 1/2002 | Freeman |
| 2004/0109251 A1 | 6/2004 | Freeman |
| 2004/0166288 A1 | 8/2004 | Travis et al. |
| 2005/0158520 A1 | 7/2005 | Freeman |
| 2007/0269639 A1 | 11/2007 | Travis et al. |
| 2008/0075923 A1 | 3/2008 | Travis et al. |
| 2017/0003503 A1 | 1/2017 | Arndt et al. |

\* cited by examiner

METHOD FOR PRODUCING HUD COMPATIBLE WINDSHIELDS AND UNIVERSAL WEDGE LAYER FOR A WINDSHIELD

FIELD OF THE INVENTION

The invention relates to a method for producing HUD (head up display) compatible windshields.

The invention also relates to windshields obtained by said method.

DESCRIPTION OF PRIOR ART

A heady-up display, also known as HUD, is any transparent display that presents data without requiring users to look away from their usual viewpoints. Although they were initially developed for military aviation, HUDs are now used in commercial aircraft, automobiles and other, mostly professional applications. A typical HUD contains three primary components: a projector unit, a combiner, and a video generation computer. The combiner is generally an angled flat piece of glass located directly in front of the viewer, for example the windshield of a vehicle, that redirects the projected image from the projector in such a way as to see the field of view and the projected image at the same time.

In vehicles with a HUD, the double images occurring in reflection at outside and inside surfaces of the windshield are usually compensated by including an appropriate wedge angle between these outside and inside surfaces. Due to such wedge angle, the reflected images from the inside and outside surfaces of the windshield substantially overlap at the viewer's eyes. The appropriate value of the wedge angle depends on the geometric features and position of the HUD viewing field in the windshield, the position of the projector and the viewpoint of the driver. In general, a constant wedge angle value considered as the best compromise for the different driver's heights is chosen and included in the windshield. Variable wedge angle is also sometimes used to better fit with the different driver heights.

Windshields with such a wedge angle are usually made by sandwiching a wedge-shaped PVB (polyvinyl butyral) sheet between two glass sheets. Such process is for example disclosed in document U.S. Pat. No. 5,013,134. The problem with this type of process is that the wedge-shaped PBV sheet is an expensive product, which impacts significantly the cost of manufacturing of the windshield. Furthermore, as every car model requires potentially a different windshield and as the position of the HUD viewing field and the exact wedge angle required differs for each windshield, the windshield manufacturer ends up with ordering a broad variety of PVB sheets corresponding to the specific features of every windshield model. Such diversity in the features of the PVB sheets which are needed is an additional source of increased manufacturing costs.

SUMMARY OF THE INVENTION

It is an object of the invention to provide a method for producing a HUD compatible windshield which can be used for large production of different windshield models at a lower cost.

To this end, the present application provides a Method for producing a HUD compatible windshield comprising a HUD viewing field, said windshield comprising a wedge layer made from a universal wedge layer, said universal wedge layer comprising a portion with a thickness profile having a monotonously changing wedge angle wherein said profile comprises a range of wedge angles encompassing wedge angle values adapted to different windshield models, said universal wedge layer having dimensions different from the dimensions of said windshield, said method comprising the following step of:

Adapting the dimensions of the universal wedge layer to size said wedge layer, wherein said adapting is such that said wedge layer has the dimensions of said windshield and such that the wedge angle at the centre of the HUD viewing field is appropriate for compensating the double images occurring in reflection at outside and inside surfaces of the windshield at the centre of said HUD viewing field.

By adapted to different windshield models, it is meant a value of the wedge angle adapted for compensating the double images occurring in reflection at outside and inside surfaces of the windshield in said HUD viewing field for a given position or height of the observer. The HUD viewing field is the zone of the windshield wherein images are projected by the projector unit of the HUD. The position and size of HUD viewing fields will of course vary according to the vehicle and consequently according to the windshield model.

With the method according to the invention, the windshield manufacturer will indeed be able to produce a broad variety of HUD compatible windshield models starting from the same universal wedge layer, which will decrease the cost associated to the large production of the different windshields models.

In an advantageous implementation, said wedge layer is positioned in said windshield such that said wedge angle is decreasing in a direction going from the bottom of the windscreen to the top of the windscreen. In such an implementation, the thickness profile of the wedge layer is indeed advantageously positioned because it better fits with the different driver heights in order to compensate the double images occurring at these various heights.

In an advantageous implementation, the method according to the invention comprises a step of laminating transparent layers, said transparent layers comprising said wedge layer.

In an advantageous implementation, the wedge layer is a PVB layer. The PVB layer, typically sandwiched between two glass layers during a lamination process, is then consequently made from a universal PVB wedge layer. In one implementation, said universal PVB wedge layer is initially larger than the windshield to be produced and has consequently to be cut in order to size the wedge layer which will be laminated with the glass layers to form the windshield. In another implementation, said universal PVB wedge layer is initially smaller than the windshield to be produced and has consequently to be extended before the lamination process takes place. Such extension of the surface of the universal PVB wedge layer can be performed by stitching another planar PVB layer to the universal PVB wedge layer, with the help for example of ultrasonic or hot air welding.

In another advantageous implementation, the wedge layer is a glass layer. Such glass layer, typically superimposed on a PVB intermediate layer and another glass layer during the lamination process, is then made from a universal glass wedge layer. In this implementation, the universal glass wedge layer is initially larger than the windshield to be produced. In one implementation, the universal glass wedge layer is cut to size at float level on the glass ribbon in order to shape the wedge layer which will be laminated with the other transparent layers before forming the windshield. In another implementation, the cutting can also take place at the step of windshield forming wherein the glass laminate comprising the universal glass wedge layer is cut to size before forming the windshield.

It is another object of the invention to provide a universal wedge layer to be used in the above described method.

To this end, the present application provides a universal wedge layer for a windshield having a height for a vehicle, with two outside surfaces, angularly spaced apart by an angle, with at least an intermediate portion of the layer in its height where said angle is varying, characterized in that the dimensions of said layer and of said portion thereof are defined so that somewhere in said portion there is an appropriate value of said varying angle so that the wedge layer can be cut and adapted to any vehicle and any driver of the vehicle.

SHORT DESCRIPTION OF THE DRAWINGS

These and further aspects of the invention will be explained in greater detail by way of example and with reference to the accompanying drawings in which.

The figures are not drawn to scale. Generally, identical components are denoted by the same reference numerals in the figures.

DETAILED DESCRIPTION OF PREFERRED EMBODIMENTS

Figure 1:
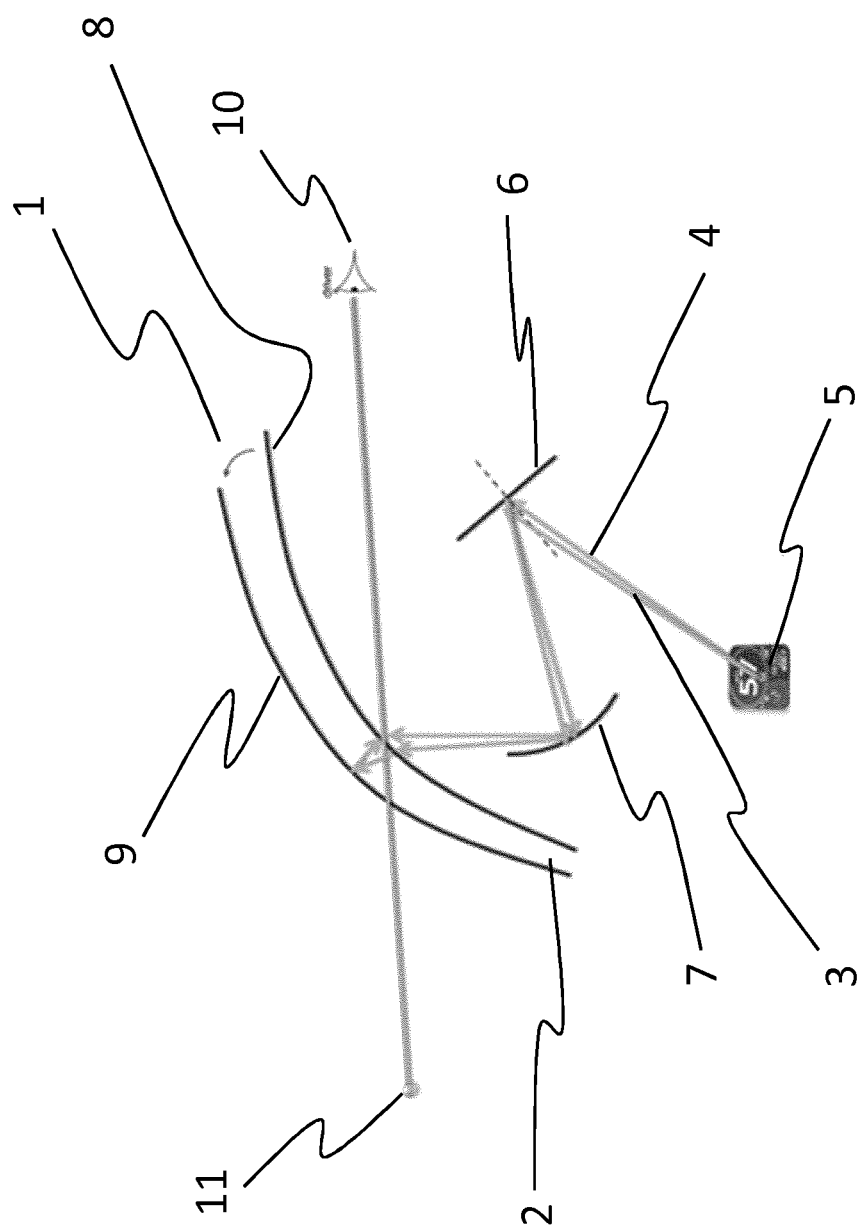
FIG. 1 shows a typical HUD from the prior art with a wedge-shaped windshield.

FIG. 1 shows a schematic view of a HUD in a vehicle wherein a wedge angle 1, or in other words a nonzero derivative of the windshield's thickness, is included in the windshield 2. In such HUD, light rays 3 and 4 emanating from the same starting point in an image source 5 are reflected by a flat mirror 6 and an aspherical mirror 7 before being reflected at the inside surface 8 and the outside surface 9 of the windshield 2. Without an appropriate wedge angle, such reflections would lead to the generation of two separate images at the viewer's eye 10. Thanks to the presence of an appropriate wedge angle 1, the HUD represented in FIG. 1 allows having an overlap of these two separate images to form a single virtual image 11.

Figure 2:
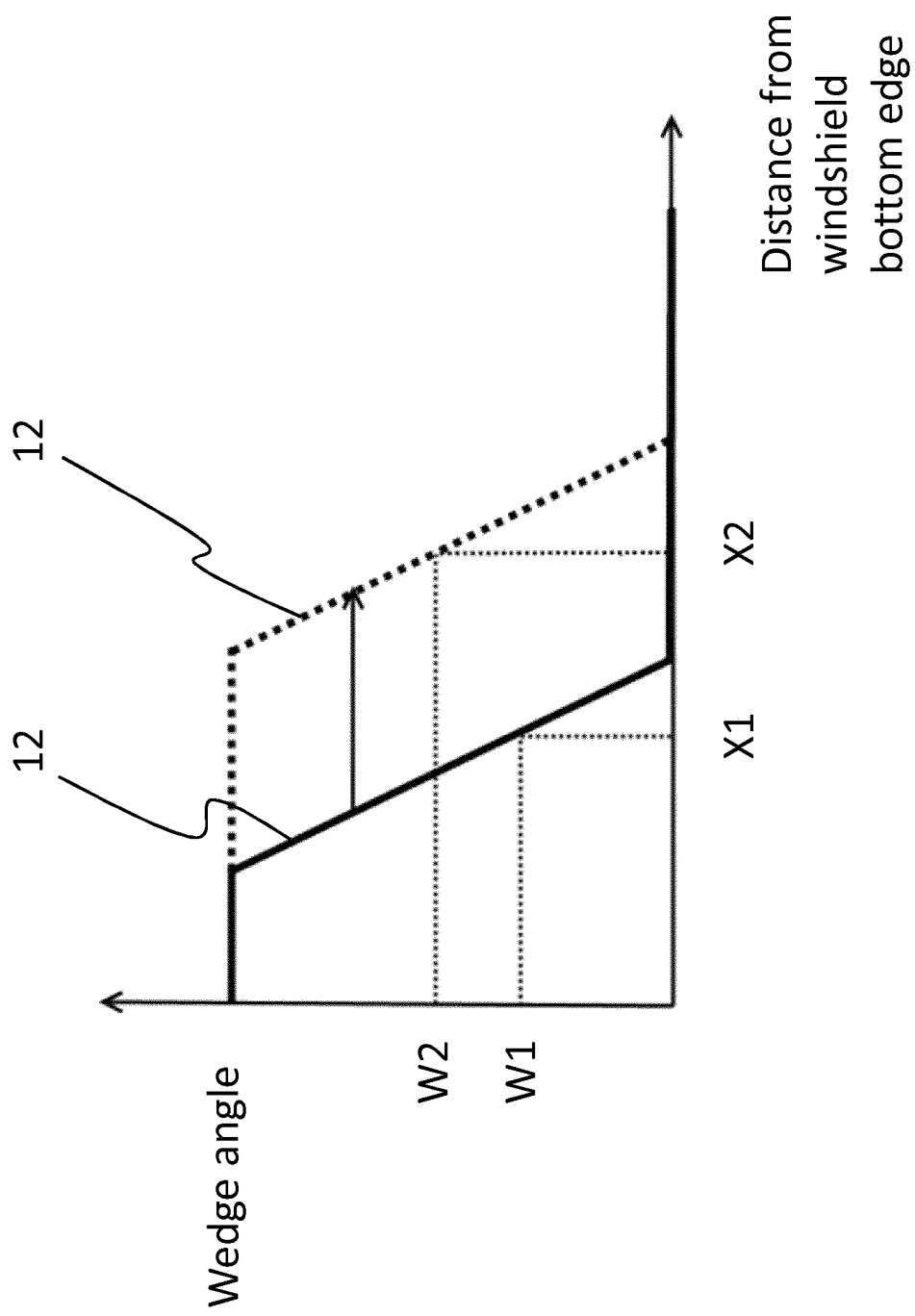
FIG. 2 shows a diagram representing the change in position of the universal wedge layer portion with a monotonously changing wedge angle profile 12 for two different models of windshields when the method according to the invention is implemented.

FIG. 2 is a diagram representing the change in position of the universal wedge layer portion with a monotonously changing wedge angle profile 12 for two different models of windshields when the method according to the invention is implemented. The horizontal axis of the graph represents the distance from the windshield bottom edge. X1 and X2 represent the centres of HUD viewing field for two different models of windshield. Due to the geometrical features of each model of windshield and of the specific HUD arrangement, different wedge angles W1 and W2 are required at the centre of these HUD viewing fields in order to optimally compensate the double images occurring in reflection. The diagram of FIG. 2 shows that the proper wedge angle value W1 can be placed at the right location X1 for the first model of windshield while the proper wedge angle value W2 can be placed at the right location X2 for the second model of windshield, and this starting from the same universal wedge layer having a portion 12 with a monotonously changing wedge angle. The match between the desired wedge angle value and right location is obtained by an appropriate adapting of the dimensions of the universal wedge layer. During this adapting, the universal wedge layer is sized to get at the same time the dimensions of the windshield and to have the desired wedge angle value at the right location of the windshield.

From FIG. 2, it is also clear that said wedge layer is positioned in said windshield such that said wedge angle is decreasing in a direction going from the bottom of the windscreen to the top of the windscreen. In such an embodiment, the thickness profile of the wedge layer is indeed advantageously positioned because it better fits with the different driver heights in order to compensate the double images occurring at these various heights.

According to one embodiment of the present invention, the wedge angle, preceding and succeeding the monotonously changing wedge angle zone, is constant.

Figure 3:
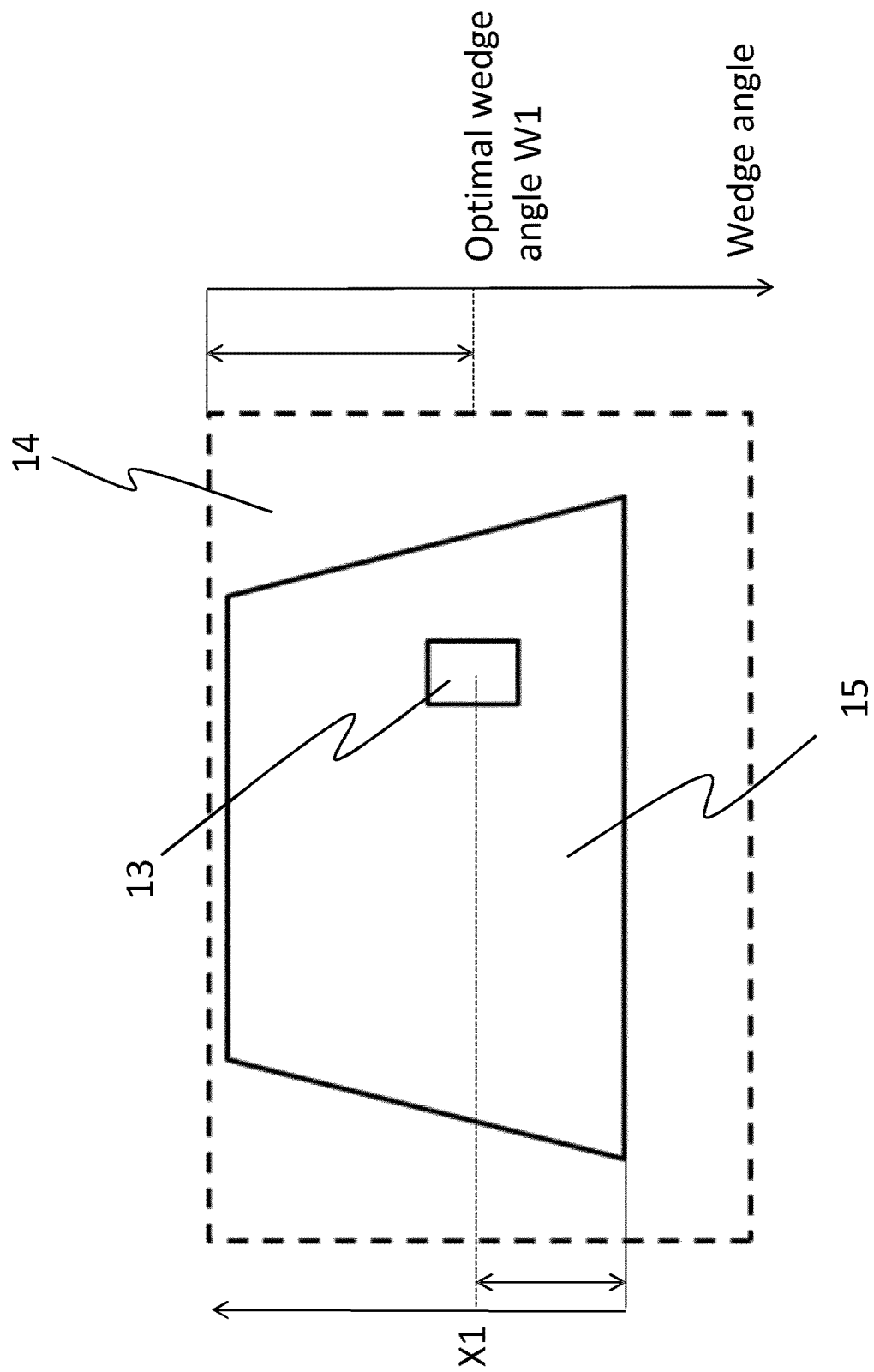
FIG. 3 and FIG. 4 represent the adapting of the dimensions of a PVB universal wedge layer to produce two different models of windshield according to the method of the invention.
Figure 4:
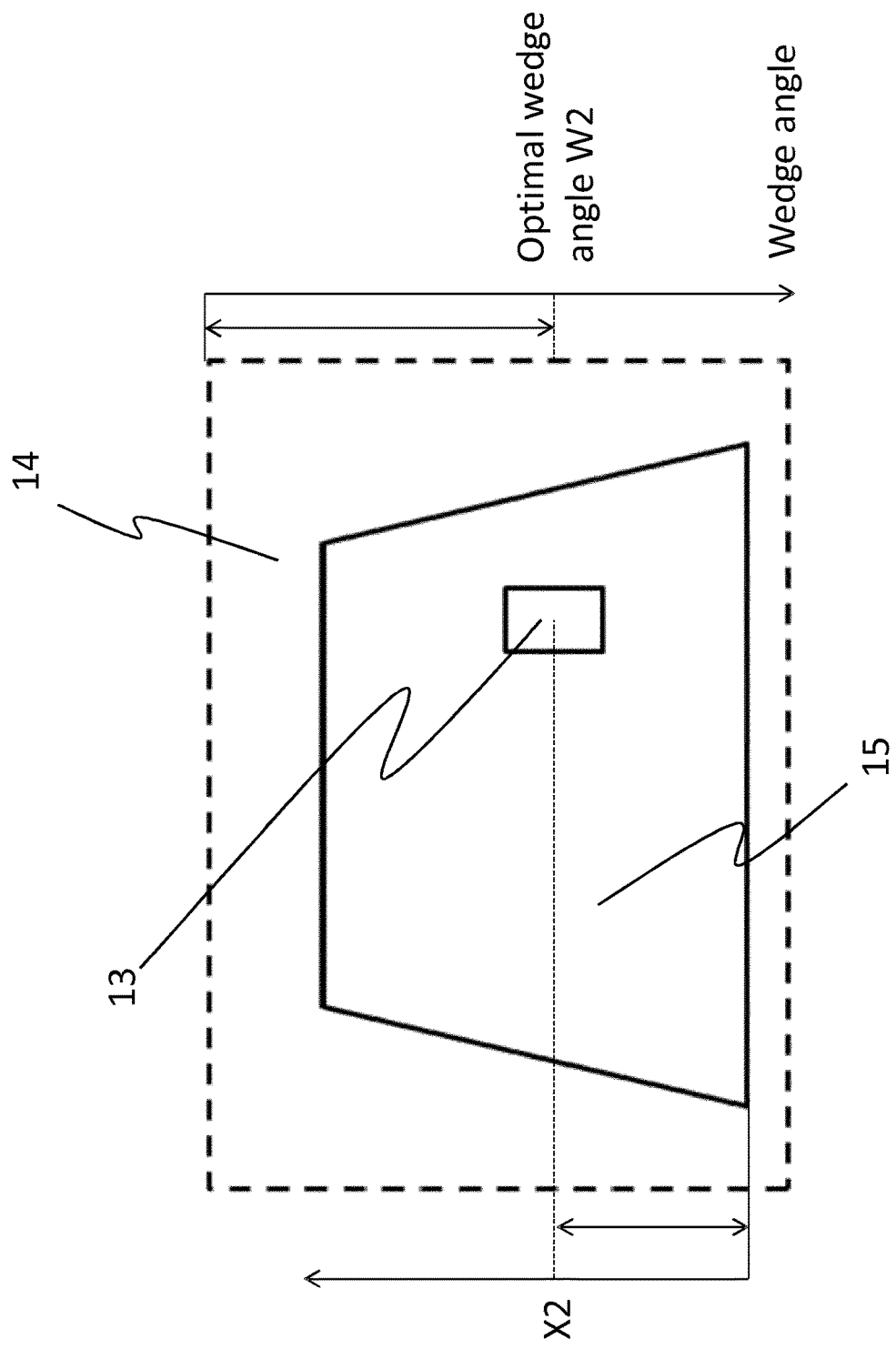

FIG. 3 and FIG. 4 represent the adaptation of the dimensions of, here, a PVB universal wedge layer 14 to produce two different models of windshield according to the method of the invention. The PVB universal wedge layer 14 is initially larger than the windshields to produce and has consequently to be cut to size to have the dimensions 15 of said windshields. The cutting is furthermore performed such to get the proper match between the location X1, X2 of the centre of the HUD viewing field 13 and the desired value of the wedge angle W1, W2 at this position.

After such cutting, the PVB wedge layer is typically laminated between two glass sheets such to obtain a three layers windshield. The PVB will then at the same time have its safety and sound insulation function to the windshield and will provide the proper wedge angle for the implementation of the HUD as explained above.

The method according to the invention can also be implemented by starting from a PVB universal wedge layer initially smaller than the different models of windshield. The PVB wedge layer is then obtained by stitching to it, for example by hot air welding or by ultrasound welding, at least one additional PVB sheet to get the proper dimensions for the windshield and to position at the same time the proper value of the wedge angle at the centre of the HUD viewing field.

In other implementations, the wedge layer is a glass layer. Such glass layer, typically superimposed on a PVB intermediate layer and another glass layer during a lamination process, is then made from a universal glass wedge layer. In this implementation, the universal glass wedge layer is initially larger than the windshield to be produced. In one implementation, the universal glass wedge layer is cut to size at float level on the glass ribbon in order to size the wedge layer which will be laminated with the other transparent layers before forming the windshield. In another implementation, the cutting can also take place at the step of windshield forming wherein the glass laminate comprising the universal glass wedge layer is cut to size before forming the windshield.

The invention claimed is:

1. A method for producing a HUD compatible windshield comprising a HUD viewing field, said windshield comprising a wedge layer made from a universal wedge layer, said universal wedge layer comprising a portion with a thickness profile having a changing wedge angle wherein said profile comprises a range of wedge angles encompassing wedge angle values adapted to different windshield models, said universal wedge layer having dimensions different from the dimensions of said windshield, said method comprising:

adapting dimensions of the universal wedge layer to size said wedge layer, wherein said adapting is such that said wedge layer has dimensions of said windshield and such that a wedge angle at a centre of the HUD viewing field is appropriate for compensating double images occurring in reflection at outside and inside surfaces of the windshield at the centre of said HUD viewing field.

2. The method according to claim 1, further comprising laminating transparent layers, said transparent layers comprising said wedge layer.

3. The method according to claim 2, wherein said universal wedge layer is a universal PVB wedge layer, said universal PVB wedge layer being initially larger than said windshield, said adapting of the dimensions comprising a cutting in order to size the PVB wedge layer, said method comprising subsequently:

Laminating the PVB wedge layer and the other transparent layers to form said windshield.

4. The method according to claim 2, wherein said universal wedge layer is a universal PVB wedge layer, said universal PVB wedge layer being initially smaller than said windshield, said adapting of the dimensions comprising an extension of an area of said universal PVB wedge layer in order to size the PVB wedge layer, said method further comprising subsequently:

laminating the PVB wedge layer and the other transparent layers to form said windshield.

5. The method according to claim 2, wherein said universal wedge layer is a universal glass wedge layer, said universal glass wedge layer being initially larger than said windshield, said adapting of the dimensions comprising a cutting at float level on a glass ribbon in order to size the glass wedge layer, said method further comprising subsequently:

laminating the glass wedge layer and the other transparent layers to form said windshield.

6. The method according to claim 2, wherein said universal wedge layer is a universal glass wedge layer, said universal glass wedge layer being initially larger than said windshield, said adapting of the dimensions comprising a cutting to size at a step of windshield forming wherein the glass laminate comprising the universal glass wedge layer is cut to size before forming the windshield, said method further comprising before the adapting:

laminating the universal glass wedge layer and the other transparent layers to form a glass laminate.

7. A universal wedge layer for a windshield having a height for a vehicle, with two outside surfaces, angularly spaced apart by an angle, with at least an intermediate portion of the layer in its height where said angle is varying, wherein dimensions of said layer and of said portion thereof are defined so that somewhere in said portion there is an appropriate value of said varying angle so that the wedge layer can be cut and adapted to a plurality of different vehicles, each vehicle requiring a different wedge angle.

8. A windshield comprising the universal wedge layer of claim 7.

9. The universal wedge layer of claim 7, wherein the universal wedge layer is larger than final dimensions of the windshield.

10. The universal wedge layer of claim 7, wherein the universal wedge layer is smaller than final dimensions of the windshield.

11. The universal wedge layer of claim 7, wherein dimensions of said layer and of said portion thereof are defined so that in said portion there is an appropriate value of said varying angle so that the wedge layer can be cut and adapted to any vehicle and any driver of the vehicle.

12. The universal wedge layer of claim 7, wherein the universal wedge layer is a PVB wedge layer.

13. The universal wedge layer of claim 7, wherein the universal wedge layer is a glass wedge layer.

* * * * *